(12) United States Patent
Park (10) Patent No.: US 10,498,176 B2
(45) Date of Patent: Dec. 3, 2019

(54) WIRELESS POWER TRANSMITTING APPARATUS AND FOREIGN OBJECT DETECTION METHOD OF THE SAME (71) Applicant: LG INNOTEK CO., LTD., Seoul (KR)

(72) Inventor: Jay Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 295 days.

(21) Appl. No.: 15/525,814

(22) PCT Filed: Nov. 18, 2015

(86) PCT No.: PCT/KR2015/012391
§ 371 (c)(1),
(2) Date: May 10, 2017

(87) PCT Pub. No.: WO2016/080751
PCT Pub. Date: May 26, 2016

(65) Prior Publication Data
US 2017/0331334 A1 Nov. 16, 2017

(30) Foreign Application Priority Data
Nov. 21, 2014 (KR) .................. 10-2014-0163635

(51) Int. Cl.
*H02J 50/50* (2016.01)
*H02J 50/60* (2016.01)
*H02J 50/12* (2016.01)
*H04B 5/00* (2006.01)
*H02J 50/80* (2016.01)
*H02J 7/02* (2016.01)

(52) U.S. Cl.
CPC .............. *H02J 50/60* (2016.02); *H02J 50/12* (2016.02); *H04B 5/0037* (2013.01); *H02J 7/025* (2013.01); *H02J 50/80* (2016.02)

(58) Field of Classification Search
CPC combination set(s) only.
See application file for complete search history.

(56) References Cited

U.S. PATENT DOCUMENTS

| | | | |
|---|---|---|---|
| 2010/0084918 A1* | 4/2010 | Fells | ...................... H02J 5/005 307/32 |
| 2013/0162220 A1 | 6/2013 | Iijima et al. | |

(Continued)

FOREIGN PATENT DOCUMENTS

| | | |
|---|---|---|
| JP | 2013-135599 A | 7/2013 |
| JP | 2014-7863 A | 1/2014 |

(Continued)

*Primary Examiner* — Daniel Kessie
(74) *Attorney, Agent, or Firm* — Birch, Stewart, Kolasch & Birch, LLP (57) ABSTRACT A method for detecting a foreign object of a wireless power transmitting apparatus according to an embodiment of the present invention includes: outputting ping signals periodically for sensing a wireless power receiving apparatus; sensing input current for the ping signals; comparing the sensed input current with a predetermined current value; and when the sensed input current for a plurality of the ping signals exceeds the predetermined current value, determining that there is a foreign object on a surface of the wireless power transmitting apparatus.

11 Claims, 9 Drawing Sheets

(56) References Cited

U.S. PATENT DOCUMENTS

| | | | | |
|---|---|---|---|---|
| 2013/0257168 A1* | 10/2013 | Singh | ............... | H02J 17/00 |
| | | | | 307/104 |
| 2013/0328411 A1* | 12/2013 | Tanabe | ............... | H02J 50/10 |
| | | | | 307/104 |
| 2014/0225628 A1 | 8/2014 | Yoon et al. | | |
| 2014/0266036 A1 | 9/2014 | Jung et al. | | |
| 2015/0123602 A1* | 5/2015 | Patino | ............... | H02J 7/025 |
| | | | | 320/108 |
| 2017/0141604 A1* | 5/2017 | Park | ............... | H02J 7/025 |

FOREIGN PATENT DOCUMENTS

| | | |
|---|---|---|
| JP | 2014-87249 A | 5/2014 |
| KR | 10-2014-0102553 A | 8/2014 |
| KR | 10-2014-0113147 A | 9/2014 |

\* cited by examiner

| Name | Valve | Unit | Period |
|---|---|---|---|
| gTemp[0] | -128 | Unit | 1000 |
| gTemp[1] | 39 | Unit | 1000 |
| gTemp[2] | 38 | Unit | 1000 |
| RunTimeParams[0].wCoilCurrent | 0 | DEC | 200 |
| RunTimeParams[0].wCoilCurrent | 632 | DEC | 200 |

WIRELESS POWER TRANSMITTING APPARATUS AND FOREIGN OBJECT DETECTION METHOD OF THE SAME

CROSS REFERENCE TO RELATED APPLICATIONS

This application is the National Phase of PCT International Application No. PCT/KR2015/012391, filed on Nov. 18, 2015, which claims priority under 35 U.S.C. 119(a) to Patent Application No. 10-2014-0163635, filed in the Republic of Korea on Nov. 21, 2014, all of which are hereby expressly incorporated by reference into the present application.

TECHNICAL FIELD

The present invention relates to wireless charging, and more specifically, a method for detecting foreign objects on a wireless power transmitting apparatus included in a wireless charging system.

BACKGROUND ART

As wireless communications technology continues to advance, wireless power transmitting/receiving technology which allows power to be wirelessly transmitted to electronic devices has started to receive more attention. Wireless power transmitting/receiving technology may be diversely applied not only to battery charging of portable terminals, but also to the delivery of power to home appliances, electric cars, or subways.

Wireless power transmitting/receiving technology uses the fundamental principle of magnetic induction. In this case, in order to increase the efficiency of power transmission and reception, it is necessary to align a transmitting coil of the wireless power transmitting apparatus and a receiving coil of the wireless power receiving apparatus. If there is a foreign object (FO) between the wireless power transmitting apparatus and the wireless power receiving apparatus, not only does the efficiency of power transmission and reception become low, but also there may be the concern of getting burned or a fire breaking out due to the rise in temperature around an area where the wireless power transmitting apparatus comes into contact with the foreign object.

Representative examples of these foreign objects are a disc-shaped coin, a ring-shaped accessory, a foil-type thin metal plate, and the like, and especially a foreign object which is formed of steel or aluminum causes problems.

In general, the wireless power transmitting apparatus periodically sends a ping signal for determining whether there is a wireless power receiving apparatus, and in the case that there is a wireless power receiving apparatus, after an identification and configuration process, the wireless power transmitting apparatus transfers power to the wireless power receiving apparatus.

During the transfer of power, the wireless power transmitting apparatus calculates the amount of power loss due to a foreign object, and if an amount of the power loss is greater than a predetermined level, it is assumed that there is a foreign object and the transfer of power may be stopped. Or, during the transfer of power, the wireless power transmitting apparatus detects a temperature of a surface, and if the temperature rises above a predetermined level, it is assumed that there is a foreign object and the transfer of power may be stopped.

When using this method, however, a timing of detecting a foreign object is late such that heat has already been generated, thus the power transfer stops when the charging efficiency becomes low. In addition, when receiving power information is not obtained from the wireless power transmitting apparatus, there is a problem in that power is continuously transmitted in a state of low charging efficiency. Furthermore, even when the wireless power receiving apparatus is not present, the wireless power transmitting apparatus becomes heated due to the ping signals which are continuously sent.

DISCLOSURE

Technical Problem

Embodiments of the present invention provide a method for detecting a foreign object on a wireless power transmitting apparatus included in a wireless charging system.

Technical Solution

A method for detecting a foreign object on a wireless power transmitting apparatus according to an embodiment of the present invention includes: outputting ping signals periodically for sensing a wireless power receiving apparatus; sensing the input current of the ping signal; comparing the sensed input current with a predetermined current value; and when the sensed input current for a plurality of the ping signals exceeds the predetermined current value, determining that there is a foreign object on a surface of the wireless power transmitting apparatus.

The plurality of the ping signals may be a plurality of the ping signals which continue to be released at least twice.

When the sensed input current is at least 1.3 times the predetermined current value, it is possible to determine that there is a foreign object on a surface of the wireless power transmitting apparatus.

The predetermined current value may be an input current of the ping signals that are expected to be sensed in the case a foreign object is not present on the surface of the wireless power transmitting apparatus.

When it is determined that there is a foreign object, the method may further include sending an alarm message to a foreign object detection indicator. The foreign object detection indicator may be a display equipped in the wireless power transmitting apparatus or a display equipped in the wireless power receiving apparatus. For example, in the case of a display of a portable terminal or a receiver disposed in a vehicle, it may be possible for the detection to be indicated through a display in a vehicle or a speaker.

The wireless power transmitting apparatus includes: a current sensor which senses input current; an inverter which converts the input current to an alternating current wave form; a resonance circuit which is activated by the inverter, and a control unit which controls the inverter, wherein the current sensor senses the input current for ping signals which are output periodically in order to sense the wireless power receiving apparatus, wherein the control unit compares the sensed input current with a predetermined current value, and when the sensed input current for a plurality of the ping signal exceeds the predetermined current value, the control unit determines that there is a foreign object.

The plurality of the ping signals may be a plurality of the ping signals which continue to be released at least twice.

When it is determined that there is a foreign object, the control unit may be configured to send an alarm message to a foreign object detection indicator.

When it is determined that there is a foreign object, the control unit may control the inverter in order to stop outputting a ping signal or transferring power.

The inverter may be a half-bridge inverter or a full-bridge inverter.

The control unit may control the inverter using a PWM (pulse width modulation) method.

The resonance circuit may include at least one first coil and a capacitor.

The resonance circuit may include three first coils.

A method for wireless power transmission of a wireless power transmitting apparatus according to an embodiment of the present invention includes: outputting a ping signal periodically for sensing a wireless power receiving apparatus; detecting whether there is a foreign object on the wireless power transmitting apparatus while outputting the ping signal; when the foreign object is detected, sending an alarm message to an external apparatus; when the wireless power receiving apparatus is detected, performing a configuration for transferring power to the wireless power receiving apparatus; and transferring power to the wireless power receiving apparatus.

Advantageous Effects

According to embodiments of the present invention, also in a step prior to initiating the transfer of power, it may be possible to detect a foreign object present on the wireless power transmitting apparatus with a high degree of sensibility. Accordingly, it may be possible to increase an efficiency of wireless charging and prevent a user from getting low-temperature burns due to the foreign object. Furthermore, by preventing a surface of the wireless power transmitting apparatus from being kept in a state of high temperature for a long time due to a foreign object, it may be possible to increase durability of the wireless power transmitting apparatus.

MODE FOR INVENTION

While the invention is open to various modifications and alternative embodiments, specific embodiments thereof are shown by way of example in the drawings and will be described. However, it should be understood that there is no intention to limit the invention to the particular embodiments disclosed, but on the contrary, the invention is to cover all modifications, equivalents, and alternatives falling within the spirit and scope of the invention.

It will be understood that, although the terms including ordinal numbers such as "first," "second," etc. may be used herein to describe various elements, these elements are not limited by these terms. These terms are only used to distinguish one element from another. For example, a second element could be termed a first element without departing from the teachings of the present inventive concept, and similarly a first element could be also termed a second element. The term "and/or" includes any and all combination of one or more of the related listed items.

When an element is referred to as being "connected to" or "coupled with" another element, not only it can be directly connected or coupled to the other element, but also it can be understood that intervening elements may be present. In contrast, when an element is referred to as being "directly connected to" or "directly coupled with" another element, there are no intervening elements present.

The terminology used herein is for the purpose of describing particular embodiments only and is not intended to limit the present inventive concept. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings, and regardless of the numbers in the drawings, the same or corresponding elements will be assigned with the same numbers and overlapping descriptions will be omitted.

Figure 1:
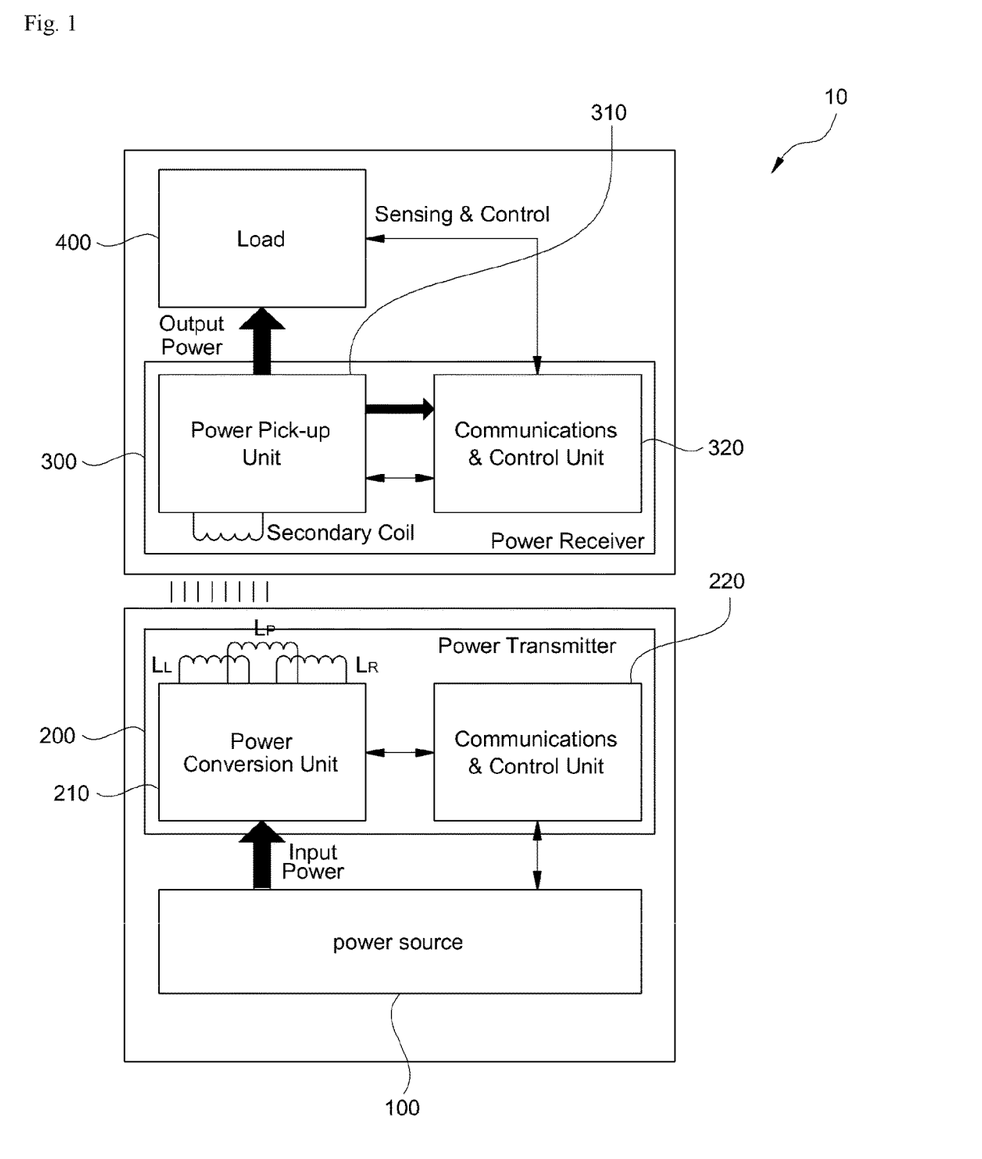
FIG. 1 shows a block diagram of a wireless charging system according to an embodiment of the present invention.

FIG. 1 shows a block diagram of a wireless charging system according to an embodiment of the present invention.

Referring to FIG. 1, a wireless charging system 10 includes a power source 100, a wireless power transmitting apparatus 200, a wireless power receiving apparatus 300 and a load terminal 400.

The wireless power transmitting apparatus 200 is connected to the power source 100 and receives power from the power source 100. Furthermore, the wireless power transmitting apparatus 200 wirelessly transmits power to the wireless power receiving apparatus 300. In this case, the wireless power transmitting apparatus 200 may transmit power using an electromagnetic induction method. To this end, the wireless power transmitting apparatus 200 may include a power conversion unit 210 and a control unit 220. The power conversion unit 210 converts electrical energy, which is input from the power source 100 to a power signal. Here, the power signal may refer to an oscillating magnetic field. To this end, the power conversion unit 210 may include at least one transmitting coil (primary coil). For example, the transmitting coil may include 3 transmitting coils ($L_{primary}(L_P)$, $L_{Left}(L_L)$ and $L_{Right}(L_R)$). Furthermore, the control unit 220 controls power transmission of the wireless power transmitting apparatus 200. For example, the control unit 220 may adjust the power to be transmitted to a level required by the wireless power receiving apparatus 300.

The wireless power receiving apparatus 300 wirelessly receives power from the wireless power transmitting apparatus 200. Furthermore, the wireless power receiving apparatus 300 provides the received power to the load terminal 400. To this end, the wireless power receiving apparatus 300 may include a power receiving unit 310 and control unit 320. The power receiving unit 310 converts a power signal which is received from the wireless power transmitting apparatus 200 to electric energy. To this end, the power receiving unit 310 may include a receiving coil (secondary coil). Furthermore, the control unit 320 controls power transmission of the wireless power transmitting apparatus 300. For example, the control unit 320 may adjust the power to be transmitted to a level suitable to the load terminal 400.

Figure 2:
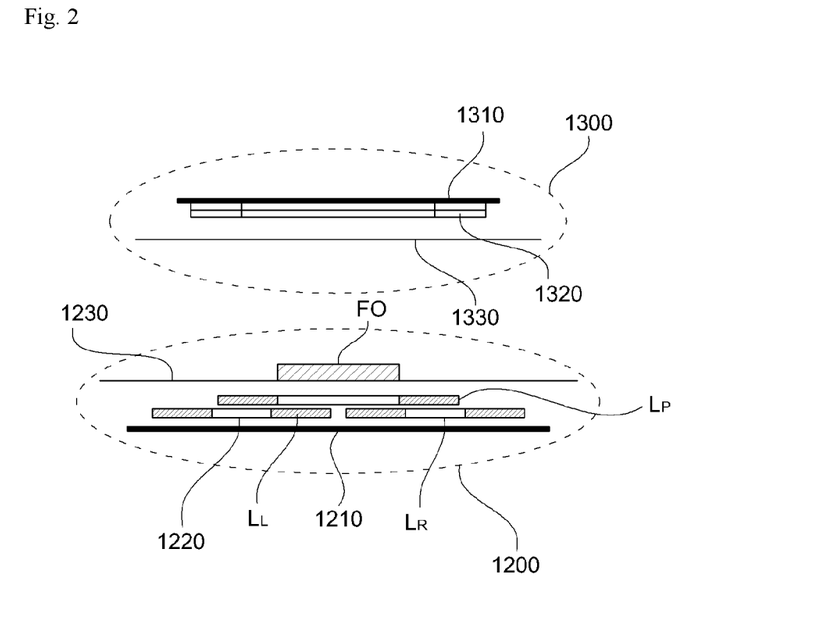
FIG. 2 is a view showing a wireless power transmitting apparatus and a wireless power receiving apparatus which are aligned according to an embodiment of the present invention.

FIG. 2 is a view showing a wireless power transmitting apparatus and a wireless power receiving apparatus, which are aligned according to an embodiment of the present invention. A wireless power transmitting apparatus 1200 and a wireless power receiving apparatus 1300 shown in FIG. 2 correspond to the wireless power transmitting apparatus 200 and the wireless power receiving apparatus 300 shown in FIG. 1, respectively.

Referring to FIG. 2, the wireless power transmitting apparatus 1200 includes a shield layer 1210, a coil layer 1220 disposed on the shield layer 1210, and a surface layer 1230 disposed on the coil layer 1220. The coil layer 1220 may be alternatively used with a primary coil, and the surface layer 1230 may be alternatively used with an interface surface. The coil layer 1220 may include at least one coil which is wire-wound in a spiral shape or a helical shape on a plane, and each coil may have a round shape, a racetrack shape, a rectangular shape, a triangular shape, or a shape of a rounded corner polygon. The coil layer 1220 and the surface layer 1230 may be spaced apart from each other by a predetermined distance. The coil layer 1220 may include at least one coil. For example, the coil layer 1220 may include a single transmitting coil, 2 transmitting coils disposed in parallel, or one transmitting coil (LP) disposed on 2 transmitting coils (LL, LP) which are disposed in parallel.

Furthermore, the wireless power receiving apparatus 1300 includes a shield layer 1310, a coil layer 1320 disposed on the shield layer 1310, and a surface layer 1330 disposed on the coil layer 1320. The coil layer 1320 may be alternatively used with a secondary coil, and the surface layer 1330 may be alternatively used with an interface surface. The coil layer 1320 may include at least one coil which is wire-wound in a spiral shape or a helical shape on a plane, and each coil may have a round shape, a racetrack shape, a rectangular shape, a triangular shape, or a shape of a rounded corner polygon. The coil layer 1320 and the surface layer 1330 may be spaced apart from each other by a predetermined distance.

For wireless charging, the surface layer 1230 of the wireless power transmitting apparatus 1200 and the surface layer 1330 of the wireless power receiving apparatus 1300 face each other, and the surface layer 1220 and the surface layer 1320 may be aligned in a mutually corresponding position.

If there is a foreign object on the surface layer 1230 of the wireless power transmitting apparatus 1200, the wireless power transmitting apparatus 1200 is required to detect the foreign object. In general, the wireless power transmitting apparatus 1200 may detect the foreign object in a power transferring step using an equation 1 as shown below.

$$FO_{loss}=P_{TX}-P_{TXloss}-P_{RX} \quad \text{[Equation 1]}$$

Here, $P_{TX}$ refers to power which is transmitted by the wireless power transmitting apparatus 1200, $P_{RX}$ refers to a power which is received by the wireless power receiving apparatus 1300, and $P_{TXloss}$ refers to a loss value expected in advance which occurs during power transmission. When $FO_{loss}$ exceeds a critical value ($P_{fod\_th}$), e.g. a range of 250 to 350 mW, the wireless power transmitting apparatus 1200 may determine that the foreign object is present on the wireless power transmitting apparatus 1200. When using this method, however, the degree of sensitivity of detection of the foreign object is low, and since the foreign object is detected while performing power transmission, there is a problem in regards to a decrease in the efficiency of power transmission.

Accordingly, it is necessary to prevent the temperature of the surface 1230 from rising by detecting the foreign object on the wireless power transmitting apparatus before the power transmission step, and to increase the efficiency of wireless charging. Such a method is useful for detecting a foreign object in the case the wireless power receiving apparatus does not send information on the received power or the wireless power receiving apparatus is not placed on the wireless power transmitting apparatus. Hereinafter, a method for detecting a foreign object is explained according to an embodiment of the present invention.

Figure 3:
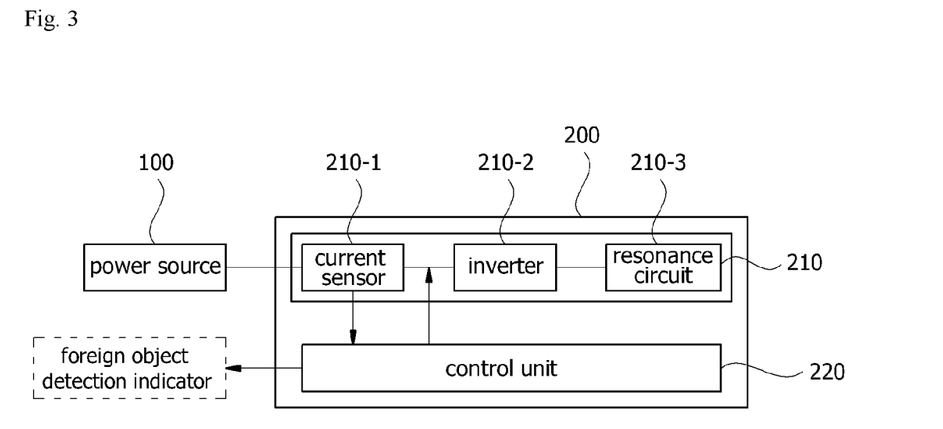
FIG. 3 is a block diagram of a wireless power transmitting apparatus according to an embodiment of the present invention.
Figure 4:
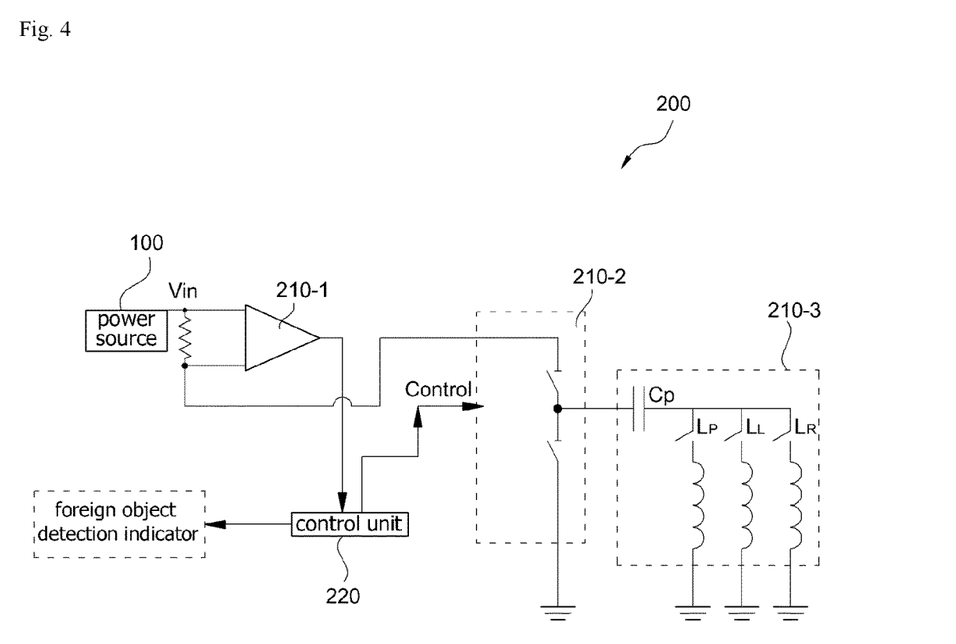
FIG. 4 is one example of a circuit diagram of a wireless power transmitting apparatus according to an embodiment of the present invention.
Figure 5:
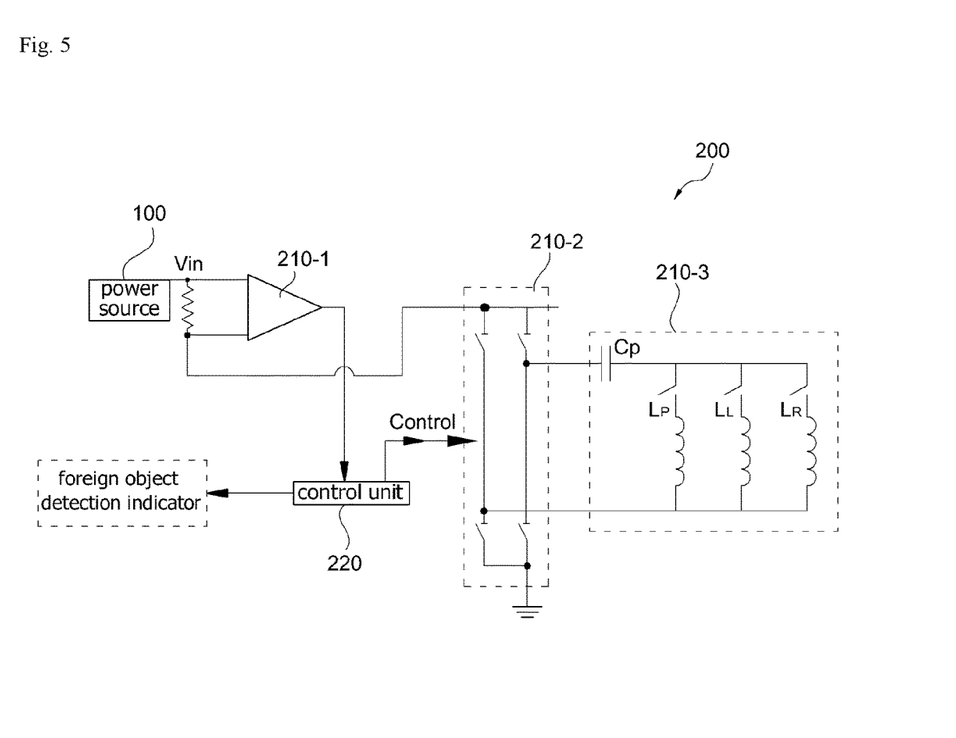
FIG. 5 is another example of a circuit diagram of a wireless power transmitting apparatus according to an embodiment of the present invention.

FIG. 3 is a block diagram of a wireless power transmitting apparatus according to an embodiment of the present invention, FIG. 4 is one example of a circuit diagram of a wireless power transmitting apparatus according to an embodiment of the present invention, and FIG. 5 is another example of a circuit diagram of a wireless power transmitting apparatus according to an embodiment of the present invention.

Referring to FIG. 3 to FIG. 5, the wireless power transmitting apparatus 200 includes a current sensor 210-1, an inverter 210-2, a resonance circuit 210-3 and a control unit 220.

The current sensor 210-1 senses an input current which is input to the inverter 210-2, and delivers it to the control unit 220. In the present disclosure, the current sensor 210-1 may be alternatively used with a sensing unit.

The inverter 210-2 converts a direct current (DC) which is input to an alternating current (AC) waveform, and activates the resonance circuit 210-3. The inverter 210-2 may be a half bridge inverter as shown in FIG. 4 or a full bridge inverter as shown in FIG. 5. In FIG. 4 and FIG. 5, there is shown only a part of structure of the half bridge inverter and the full bridge inverter respectively, however, it may be possible to implement a half bridge inverter and a full bridge inverter, which are generally known in the art.

The resonance circuit 210-3 includes a first coil unit and a capacitor ($C_P$), which are connected in series. The first coil unit may include at least one first coil, which is connected in parallel. Although it is shown In FIG. 4 and FIG. 5 that the resonance circuit 210-3 includes three first coils (e.g. $L_P$, $L_L$, $L_R$) by way of an example, the resonance circuit is not limited thereto.

The current sensor 210-1, the inverter 210-2 and the resonance circuit 210-3 may be included in the power conversion unit 210 of the wireless power transmitting apparatus 200 in FIG. 1.

The control unit 220 receives a message from the wireless power receiving apparatus, decodes it, and controls power transmission. In particular, the control unit 220 controls the inverter 210-2 using a value which is output from the current sensor 210-1.

According to an embodiment of the present invention, the current sensor 210-1 senses the input current for a ping signal which is output periodically. Here, the ping signal means a signal which is output from the wireless power transmitting apparatus in order to sense the wireless power receiving apparatus. Further, the input current refers to a current which is input to the inverter 210-2.

The control unit 220 compares the input current which is sensed by the current sensor 210-1 with a predetermined current value, and when the sensed input current for a plurality of the ping signals exceeds the predetermined current value, determines that there is a foreign object on a surface of the wireless power transmitting apparatus 200.

When it is determined that there is a foreign object on the wireless power transmitting apparatus 200, the control unit 200 may be configured to send an alarm message to the foreign object detection indicator or to control the inverter 210-2 to stop outputting the ping signals or transferring power. In this case, the control unit 220 may control the inverter 210-2 using a PWM (pulse width modulation) method.

Figure 6:
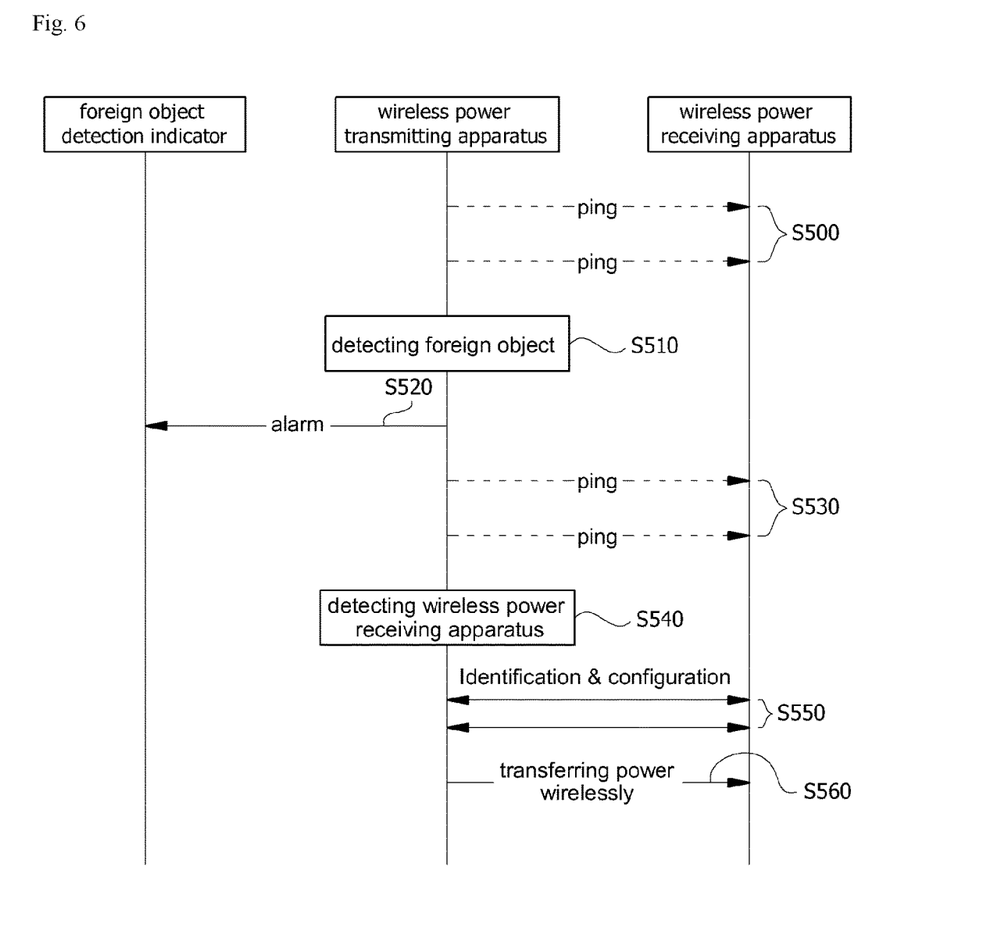
FIG. 6 is a flow chart showing a wireless power transmission method of a wireless power transmitting apparatus according to an embodiment of the present invention.
Figure 7:
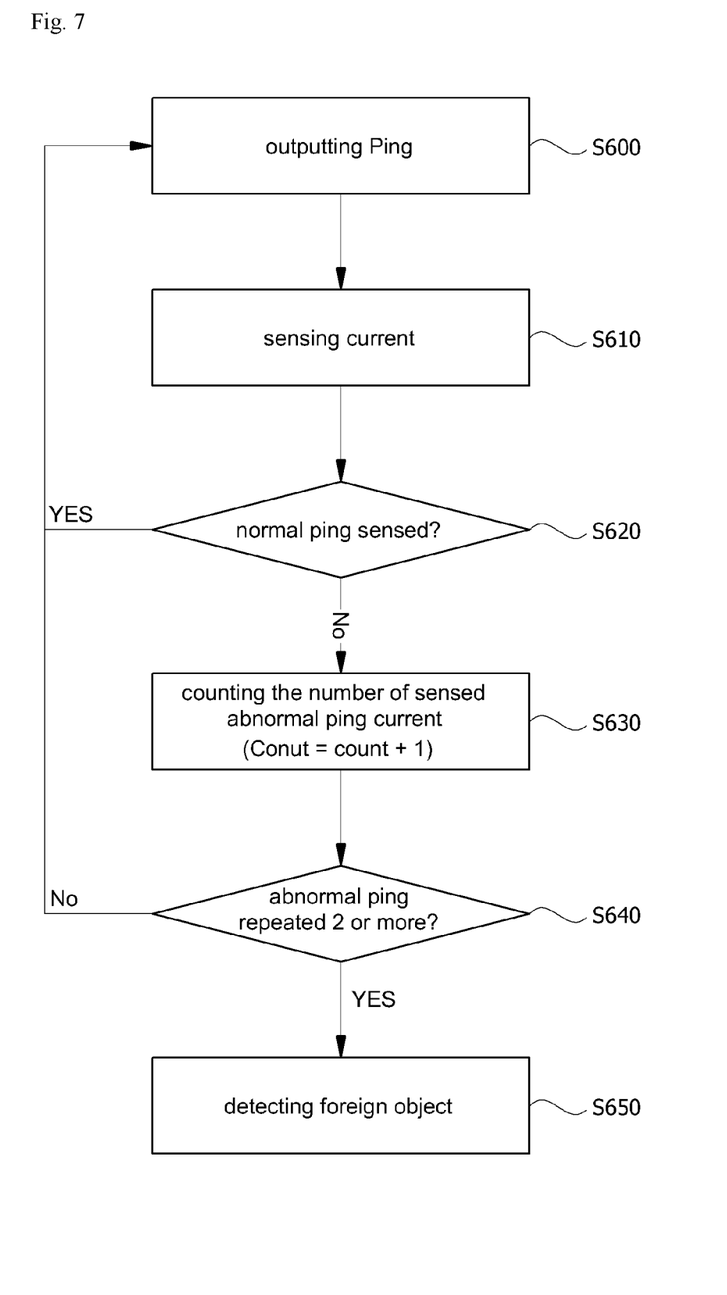
FIG. 7 is a flow chart showing a method for detecting a foreign object of a wireless power transmitting apparatus according to an embodiment of the present invention.

FIG. 6 is a flow chart showing a wireless power transmission method of a wireless power transmitting apparatus according to an embodiment of the present invention, and FIG. 7 is a flow chart showing a method for detecting a foreign object on a wireless power transmitting apparatus according to an embodiment of the present invention.

Referring to FIG. 6, the wireless power transmitting apparatus outputs the ping signals (S500). The ping signal means a signal which is output periodically from the wireless power transmitting apparatus in order to sense the wireless power receiving apparatus. The ping signals may be output according to a predetermined period, for example per 400 ms. The ping signal may be a signal which has a certain peak value.

The wireless power transmitting apparatus detects whether there is a foreign object on the wireless power transmitting apparatus while outputting the ping signals (S510). The process of detecting a foreign object by the wireless power transmitting apparatus will be described in detail with reference to FIG. 7. Referring to FIG. 7, the wireless power transmitting apparatus outputs the ping signal periodically (S600), and senses the input current for the ping signal. The input current refers to current which is able to be sensed by the current sensor included in the wireless power transmitting apparatus and which is input to the inverter. Further, the wireless power transmitting apparatus compares the sensed input current with a predetermined current value (S620). Here, the predetermined current value may refer to current of the ping signal which is expected to be sensed in the case there is no foreign object on the surface of the wireless power transmitting apparatus. When the difference between the sensed input current and the predetermined current value is below a critical value, which is the case for normal pings, the wireless power transmitting apparatus may determine that there is no foreign object and then output the ping signals continuously. On one hand, when the difference between the sensed input current for the ping signal and the predetermined current value exceeds critical value, which is the case for abnormal pings, the number of the abnormal pings are counted (S630). When the abnormal ping signal is repeated twice or more (S640), the wireless power transmitting apparatus determines that there is a foreign object on a surface thereof (S650). In contrast, when the abnormal ping is counted only 1 time, the wireless power transmitting apparatus may determine that there is no foreign object and then continues to output the ping signal. When there is a foreign object such as a coin and the like on the wireless power transmitting apparatus, a current which is applied to the ping signals cannot leave the surface of the wireless power transmitting apparatus, and the current stays on the surface of the wireless power transmitting apparatus. Accordingly, the sensed input current for the ping signal may be represented to be higher than the current that is expected. In this case, when the sensed input current for the ping signal exceeds the predetermined current value twice consecutively, the wireless power transmitting apparatus may determine that there is a foreign object on the surface of the wireless power transmitting apparatus. Here, when the sensed input current for the ping signal is 1.3 times or more than the predetermined current value, the wireless power transmitting apparatus may determine that there is a foreign object on the surface of the wireless power transmitting apparatus. When the sensed input current for the ping signal is 1.3 times or more than the predetermined current value, the temperature of the surface of the wireless power transmitting apparatus may increase rapidly if the aforementioned state continues, and thus there may be a risk about getting burned or fire breaking out.

When the wireless power transmitting apparatus senses a foreign object according to the method explained with regards to FIG. 7, the wireless power transmitting apparatus sends an alarm message to the foreign object detection indicator (S520). The foreign object detection indicator may be a portable terminal, an electronic device which is mounted on vehicles, an electronic device which is connected to a home network, a display device, a speaker device and the like in which the wireless power receiving apparatus is included. The foreign object detection indicator may output an alarm message for the foreign object through voice or screen. Accordingly, the user may remove the foreign object on the wireless power transmitting apparatus.

Thereafter, the wireless power transmitting apparatus continuously outputs the ping signals (S530), and detects the wireless power receiving apparatus (S540). The wireless power transmitting apparatus can detect the wireless power receiving apparatus by sensing the input current for the ping signal.

Furthermore, the wireless power transmitting apparatus collects information on the wireless power receiving apparatus through an identification & configuration process, and performs a configuration process for power transfer (S550). Then, the wireless power transmitting apparatus transfers power to the wireless power receiving apparatus (S560).

As explained in FIG. 6 and FIG. 7, the wireless power transmitting apparatus according to an embodiment of the present invention senses a foreign object on the wireless power transmitting apparatus prior to the power transferring process, and sends an alarm message to the foreign object detection indicator. Thus, it is possible to prevent the temperature of the surface of the wireless power transmitting apparatus from increasing before starting to charge, and to raise the efficiency of wireless charging.

Figure 8:
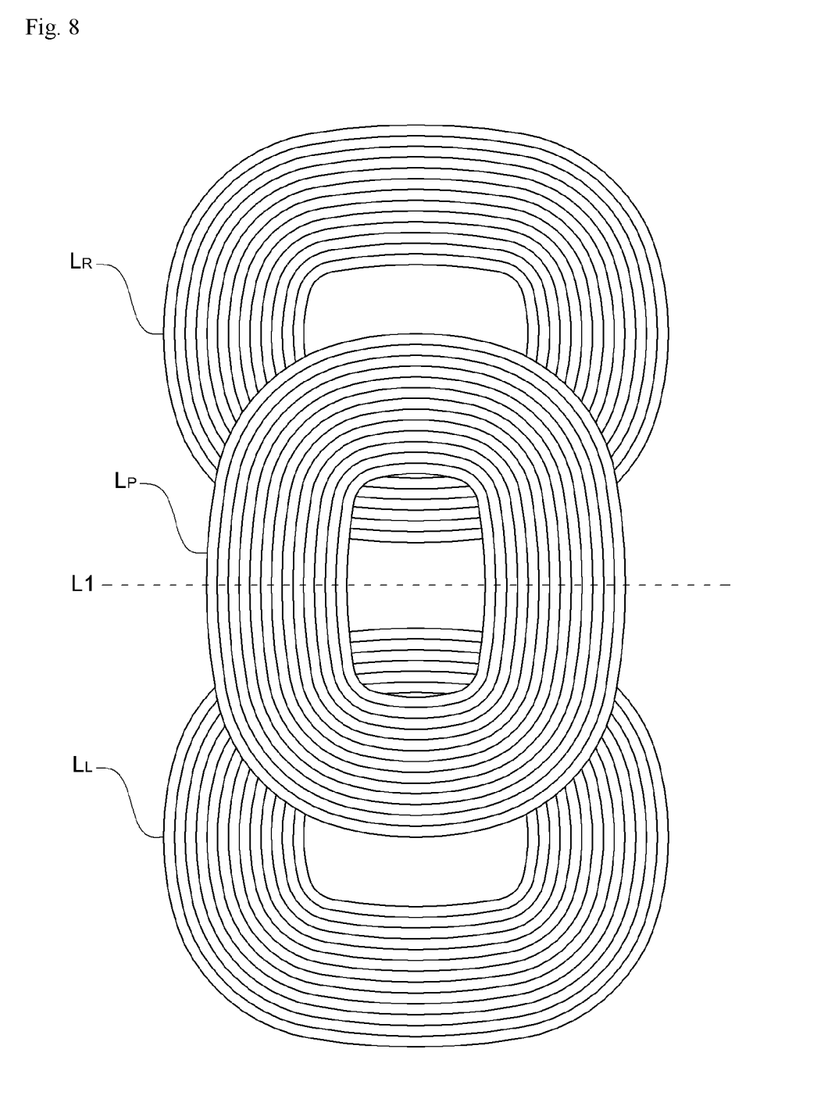
FIG. 8 is an example of a transmitting coil used for performing simulation of a method for detecting a foreign object according to an embodiment of the present invention.

Hereinafter, a simulation result of the method for detecting a foreign object according to an embodiment of the present invention is explained. As illustrated in FIG. 8, two first coils ($L_L$, $L_R$) are disposed in parallel, and a simulation is performed using a transmitting coil structure in which another first coil ($L_P$) is disposed on the two first coils ($L_L$, $L_R$). To this end, an input voltage between 3.5 and 4.5 V is applied, and the simulation is configured to output a ping signal every 5 seconds. The input current for the ping signals may vary according to the value of the input voltage and the design of the circuit.

Figure 9:
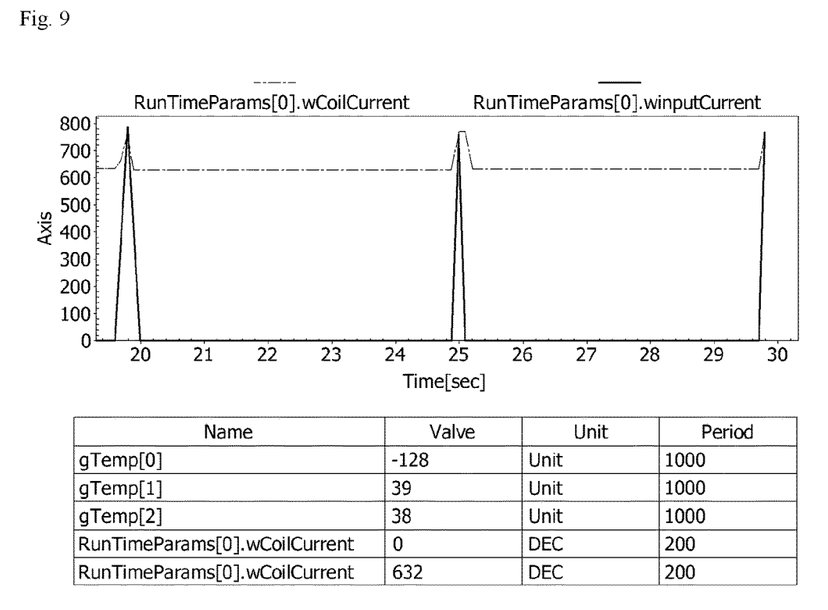
FIG. 9 is a graph showing measurement of an input current for ping signals in the case that a foreign object is not present on a surface of the wireless power transmitting apparatus.
Figure 10:
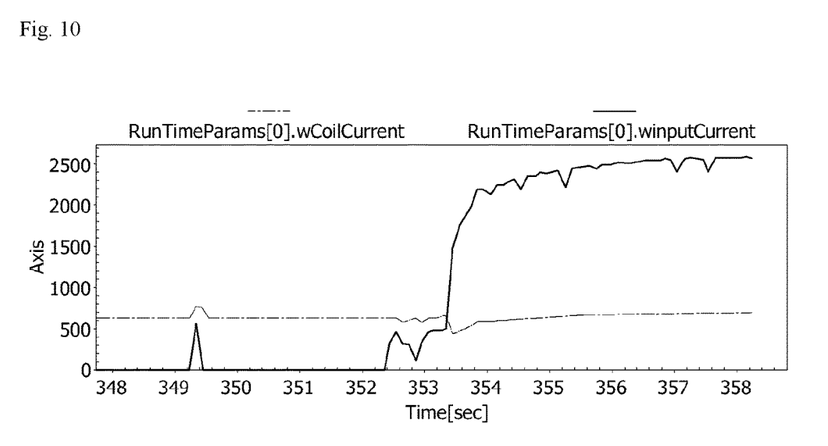
FIG. 10 is a graph showing measurement of an input current in the case a power receiving apparatus is disposed on a surface of the wireless power transmitting apparatus.
Figure 11:
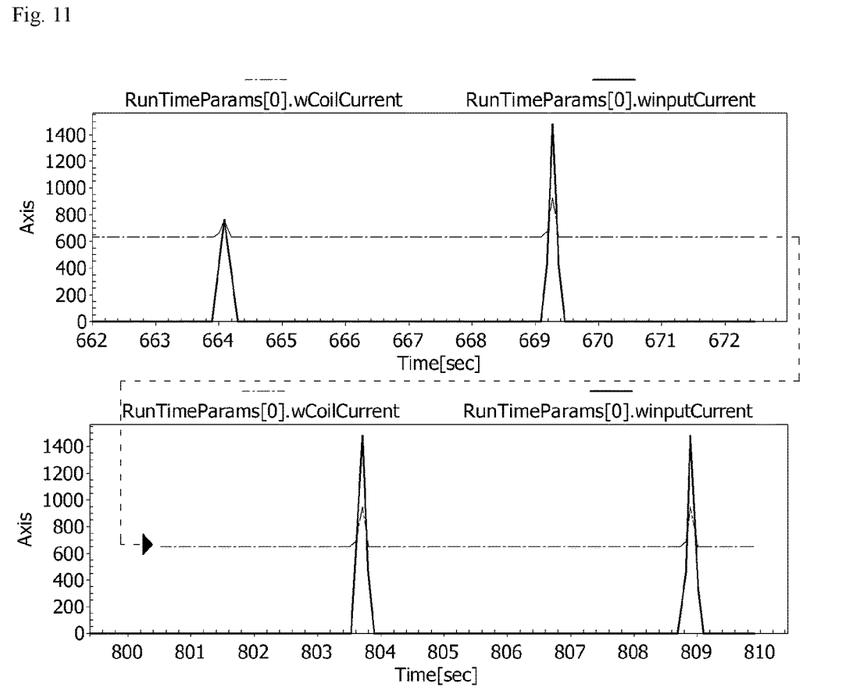
FIG. 11 is a graph showing measurement of an input current for ping signals in the case that a 10-won coin is placed onto a line 1 (L1) in FIG. 8.
Figure 12:
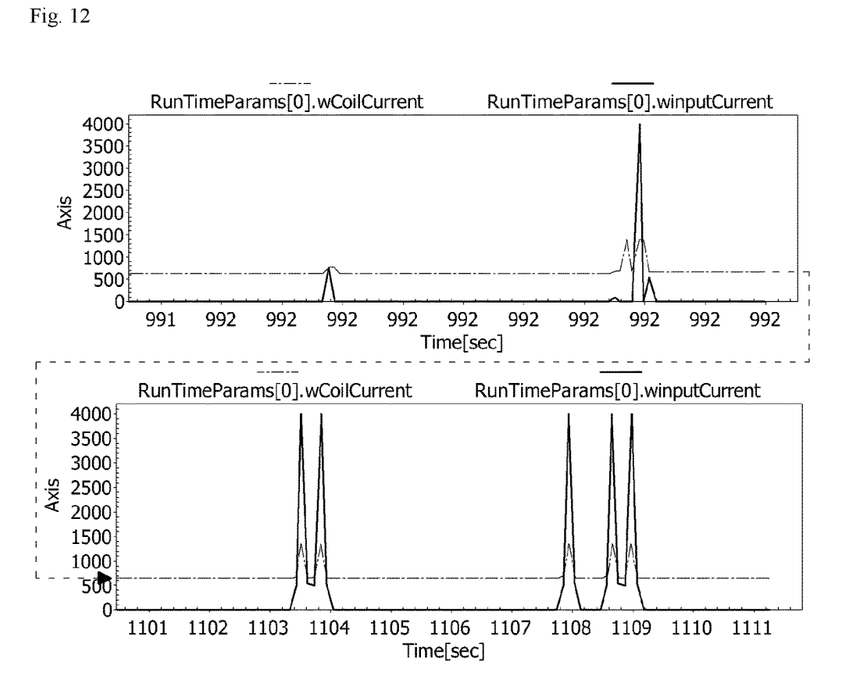
FIG. 12 is a graph showing measurement of an input current for ping signals in the case a 500-won coin is placed onto line 1 in FIG. 8.

FIG. 9 is a graph showing measurement of an input current for a ping signal in the case there is no foreign object on a surface, FIG. 10 is a graph showing measurement of an input current in the case a wireless power receiving apparatus is disposed on a surface, FIG. 11 is a graph showing measurement of an input current for ping signals in the case a 10-won coin is placed onto a line 1 (L1) in FIG. 8. FIG. 12 is a graph showing measurement of an input current for ping signals in the case a 500-won coin is placed onto the line 1 in FIG. 8.

Referring to FIG. 9, when the wireless power transmitting apparatus outputs a ping signal every 5 seconds, a periodic input current which has a constant peak value was measured.

Referring to FIG. 10, when the wireless power transmitting apparatus outputs the ping signals, an input current which has a constant peak value was measured before a foreign object or the wireless power receiving apparatus was placed on the wireless power transmitting apparatus. However, after the wireless power receiving apparatus is placed on the wireless power transmitting apparatus, the input current was increased greatly, and the increased value was maintained consistently. This is because the wireless power receiving apparatus transmits its information to the wireless power transmitting apparatus, and based on the information, an identification process and a configuration process progresses.

Referring to FIG. 11, in the case that the wireless power transmitting apparatus outputs the ping signals, although an input current having a peak value of 600 mA is measured before a coin was placed, an input current having a peak value of 1400 mA was repeatedly measured after a 10-won coin was placed.

Referring to FIG. 12, when the wireless power transmitting apparatus outputs the ping signals, an input current having a peak value of 600 mA is measured before a coin is placed. However, an input current having a peak value of 4000 mA is repeatedly measured after a 500-won coin is placed.

Thus, it can be seen that in the case that there is a foreign object on the wireless power transmitting apparatus, the input current for the ping signal is measured to be higher than the expected current value. Accordingly, a foreign object on the wireless power transmitting apparatus can be detected, and the user can be informed.

Although exemplary embodiments of the present invention have been referenced and described above, it will be understood that it is possible for those of ordinary skill in the art to implement modifications and variations to the present invention without departing from the concept and scope of the present invention listed in the following appended claims.

The invention claimed is:

1. A method for detecting a foreign object on a wireless power transmitting apparatus before transmitting power to a wireless power receiving apparatus, comprising:
   outputting periodically a ping signal for sensing the wireless power receiving apparatus,
   sensing an input current for the ping signal,
   comparing the input current with a predetermined current value, and
   determining that there is a foreign object on a surface of the wireless power transmitting apparatus based on the comparing,
   wherein the comparing comprises:
   comparing a peak value of the input current for the ping signal with the predetermined current value; and
   detecting an abnormal ping of which the peak value is 1.3 times or more than the predetermined current value, and
   wherein the determining comprises:
   counting a number of times the abnormal ping is detected; and
   determining that there is the foreign object on the surface when the abnormal ping is consecutively counted twice or more.

2. The method of claim 1, wherein the predetermined current value is an input current which is expected to be sensed for the ping signal in the case there is no foreign object on the surface of the wireless power transmitting apparatus.

3. The method of claim 1, further comprising:
   sending an alarm message to a foreign object detection indicator, when it is determined that there is a foreign object.

4. A wireless power transmitting apparatus, comprising:
   a current sensor for sensing an input current,
   an inverter for converting the input current to an alternating waveform,
   a resonance circuit activated by the inverter, and
   a control unit for controlling the inverter,
   wherein the current sensor is configured to sense the input current for a ping signal which is output periodically in order to sense a wireless power receiving apparatus,
   wherein the control unit is configured to compare the input current with a predetermined current value, and determine that there is a foreign object before transmitting power to a wireless power receiving apparatus, and
   wherein the control unit compares a peak value of the input current for the ping signal with the predetermined current value, detects an abnormal ping of which the peak value is 1.3 times or more than the predetermined current value, counts a number of times the abnormal ping is detected and determines that there is the foreign object on a surface of the wireless power transmitting apparatus when the abnormal ping is consecutively counted twice or more.

5. The wireless power transmitting apparatus of claim 4, wherein when it is determined that there is the foreign object, the control unit is configured to send an alarm message to a foreign object detection indicator.

6. The wireless power transmitting apparatus of claim 4, wherein when it is determined that there is the foreign object, the control unit controls the inverter in order to stop periodically outputting the ping signal or transferring power.

7. The wireless power transmitting apparatus of claim 4, wherein the inverter is a half-bridge inverter or a full-bridge inverter.

8. The wireless power transmitting apparatus of claim 4, wherein the control unit controls the inverter using a PWM (pulse width modulation) method.

9. The wireless power transmitting apparatus of claim 4, wherein the resonance circuit includes at least one first coil and a capacitor.

10. The wireless power transmitting apparatus of claim 4, wherein the resonance circuit includes three first coils.

11. A method for wireless power transmitting of a wireless power transmitting apparatus, comprising:

outputting periodically a ping signal for sensing a wireless power receiving apparatus, detecting whether there is a foreign object on a surface of the wireless power transmitting apparatus while outputting periodically the ping signal before the wireless power receiving apparatus is placed on the wireless power transmitting apparatus, sending an alarm message to an external apparatus, when the foreign object is detected;

performing a configuration for transferring power to the wireless power receiving apparatus, when the wireless power receiving apparatus is detected; and transferring power to the wireless power receiving apparatus, wherein the detecting comprises:

sensing an input current for the ping signal;

comparing a peak value of the input current for the ping signal with a predetermined current value;

detecting an abnormal ping of which the peak value is 1.3 times or more than the predetermined current value;

counting the number of the abnormal ping; and determining that there is the foreign object on the surface when the abnormal ping is consecutively counted twice or more.

\* \* \* \* \*